UNITED STATES PATENT OFFICE.

THOMAS B. OSBORNE, OF NEW HAVEN, CONNECTICUT.

PROCESS OF EXTRACTING ZEIN.

SPECIFICATION forming part of Letters Patent No. 456,773, dated July 28, 1891.

Application filed April 23, 1891. Serial No. 390,148. (Specimens.)

*To all whom it may concern:*

Be it known that I, THOMAS B. OSBORNE, of the town of New Haven and State of Connecticut, have invented a new and useful Process of Extracting Zein, of which the following is a specification.

Zein is an albuminoid substance found in Indian corn having many of the physical properties of pyroxyline. It has never, so far as I know, been produced except upon a very small scale in the laboratory by chemists engaged in analyzing Indian corn.

So far as I am aware, the laboratory process of extracting zein has been as follows: The powdered corn or cornmeal was heated with ethyl alcohol of from eighty to eighty-five per cent. until the zein contained in the meal was supposed to have been dissolved. The alcohol solution, having been filtered from the meal, was then evaporated. Owing to the fact that alcohol of the percentage stated is not a stable body, the proportion of water to alcohol became larger as the evaporation proceeded, until finally the zein, which is not soluble in water alone or in alcohol containing a large percentage of water, began to separate from the mixture. Further evaporation was useless, because the zein was found to become modified in some way by the continued action of hot water, so as to lose its solubility, and thus to render its subsequent recovery impracticable. At this point, therefore, the solution was cooled, and owing to the comparatively large percentage of water in the alcohol the greater portion of the zein separated from the cooled mixture. The zein so obtained was found to be mixed with fat, and to remove the fat was again dissolved in alcohol of ninety per cent., the solution again concentrated, and then poured into a large volume of absolute alcohol, in which the zein is insoluble, and from which it was precipitated in a comparatively pure condition.

From the above description it will be understood that the laboratory process was unfitted for commercial use, not only by reason of its complication, but also of the comparatively small percentage of zein thus obtained, which did not exceed six to seven per cent. of the cornmeal, and because of the cost of treating a body of raw material so large in proportion to the product obtained.

As indicated in the above statement, one of the difficulties in the successful extraction of zein from Indian corn is the liability of the substance to undergo a modification which renders it insoluble in whole or in part, and thus entails a corresponding loss of the product.

I have discovered that if the starchy constituents of the corn be separated from the nitrogenous constituents by the ordinary process of manufacturing corn-starch the residue which is left after such manufacture, and which is sold in the market under the name of "gluten-meal," contains almost all the zein which originally existed in the corn, and that the zein contained therein has not been rendered insoluble by the process of separating the starch. Although some loss of zein doubtless occurs in the separation of starch, this loss is in practice more than made up by the advantages which I find to result from such preliminary separation. The residue left after the separation of the starch by the ordinary commercial method is much less bulky than the whole meal, requires a proportionately less amount of solvent, and consequently involves less loss thereof, contains a much higher percentage (as high as thirty to forty per cent.) of zein, and is easier to handle and more tractable in its manipulation than the whole meal. Besides this the starch, which may be separated by any of the known processes, is utilized as a separate product instead of being wasted. I also find that by using alcohol of full commercial strength—say ninety-five per cent. by volume—the zein is dissolved from this residue with as much freedom as it is dissolved from the whole meal by the weaker solvent formerly used. Several advantages follow from the use of this stronger alcohol. It boils without alteration of the proportion of water contained therein, its boiling-point remains constant, (and for these two reasons there is no tendency to form a paste with what little starch may still remain in the nitrogeneous residue,) and finally it may be recovered by the ordinary process of distillation of exactly the same strength as before.

In the practice of my improved process I prefer, after the starch has been separated from the meal in any convenient manner, to place the nitrogenous residue which contains the zein in a closed vessel with an equal weight of solvent and to subject the mixture to heat and agitation. It is important that the mixture should contain a small percentage of water, because, as above stated, absolute alcohol will not dissolve the zein; but it is apparent that this necessary percentage of water may be introduced by mixture with the nitrogenous residue as well as by mixture with the solvent. The solution of zein is then removed by pressing, filtering, or otherwise, and cooled to precipitate any dissolved fat. The resulting clear solution of zein may then be evaporated in an apparatus which admits of the recovery of the solvent until the solution attains a sirupy consistence and the sirupy solution then poured into a comparatively large body of water containing about one per cent. of common salt. The zein being insoluble in water is precipitated in the form of a curd-like mass, which may be removed, dried, and pressed. Instead of separating the zein by pouring the concentrated solution into water, as above described, the solution itself may be evaporated to dryness.

By means of my improved process of extraction zein may be produced for the first time on a commercial scale and at a cost which admits of its practical application in the arts.

What I claim, and desire to secure by Letters Patent, is—

1. The herein-described process of extracting zein from Indian corn, which consists in removing the starchy constituents from the corn, treating the remaining substance thus obtained with a solvent of zein, and separating the resulting solution from the insoluble residue, substantially as and for the purpose described.

2. The herein-described process of extracting zein, which consists in treating the nitrogenous remainder left after the manufacture of corn-starch with a solvent of zein, substantially as and for the purpose described.

THOMAS B. OSBORNE.

Witnesses:
JOHN K. BEACH,
FRANCIS G. BEACH.